J. & A. RANNIE.
CRACKER-MACHINE.

No. 185,351.

Patented Dec. 12, 1876.

3 Sheets—Sheet 2.

WITNESSES:
A.W. Almqvist
John Goethals

INVENTOR:
J. Rannie
A. Rannie
BY Munn & Co
ATTORNEYS.

THE GRAPHIC CO. N.Y.

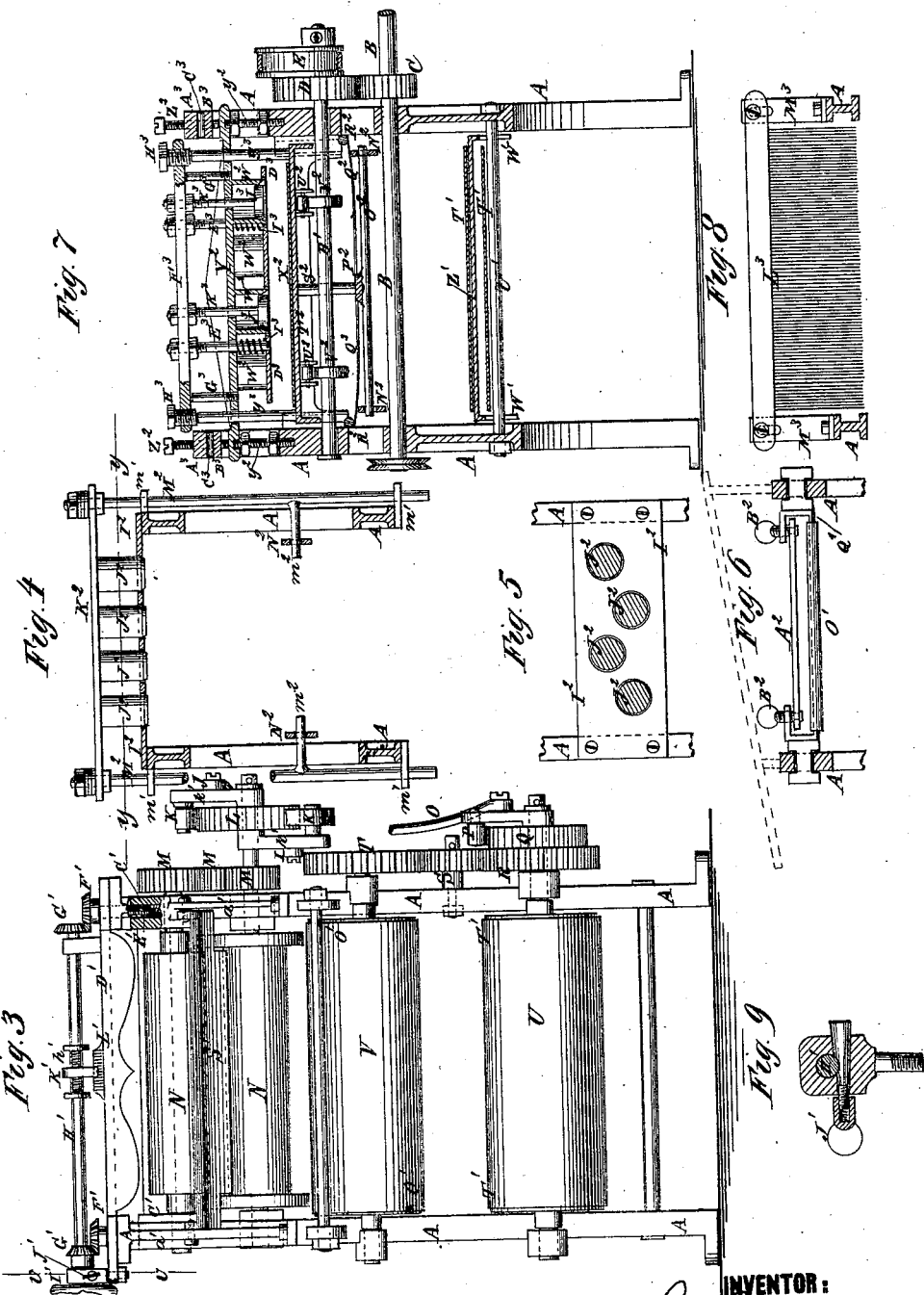

UNITED STATES PATENT OFFICE.

JOHN RANNIE AND ALEXANDER RANNIE, OF PALMYRA, NEW YORK.

IMPROVEMENT IN CRACKER-MACHINES.

Specification forming part of Letters Patent No. 185,351, dated December 12, 1876; application filed August 14, 1876.

*To all whom it may concern:*

Figure 1:
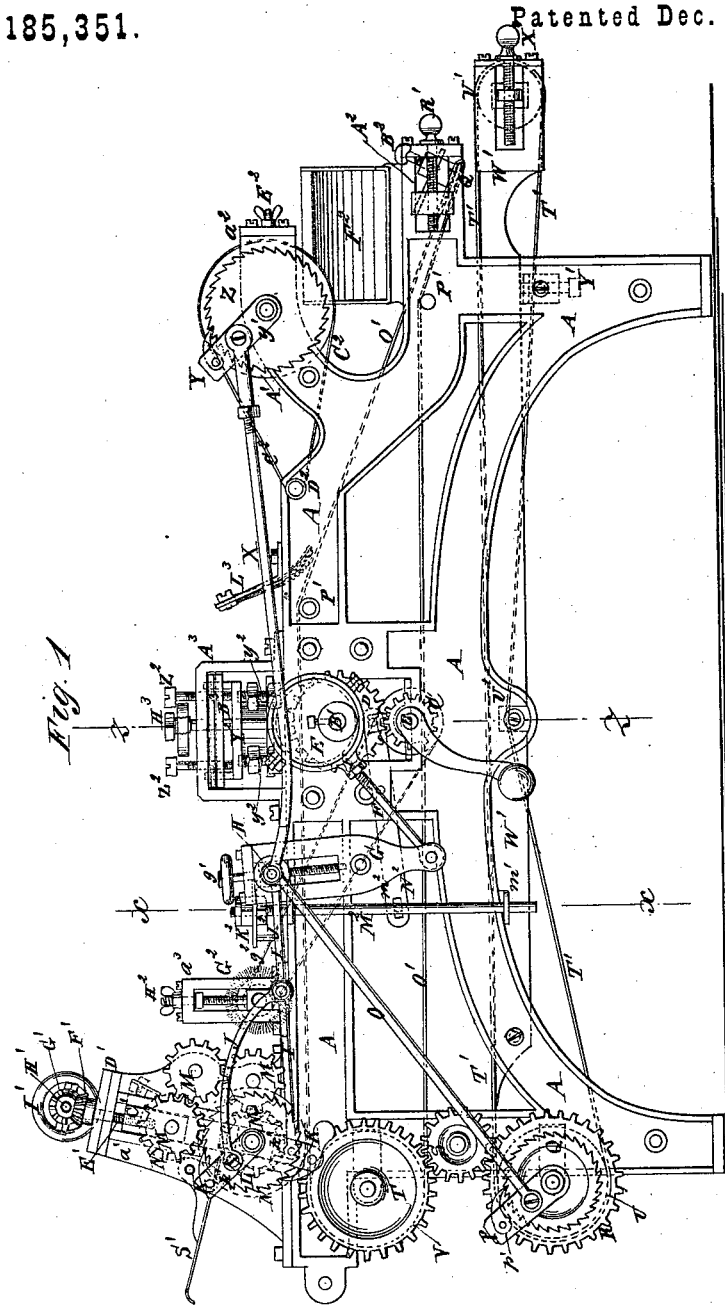
Figure 2:
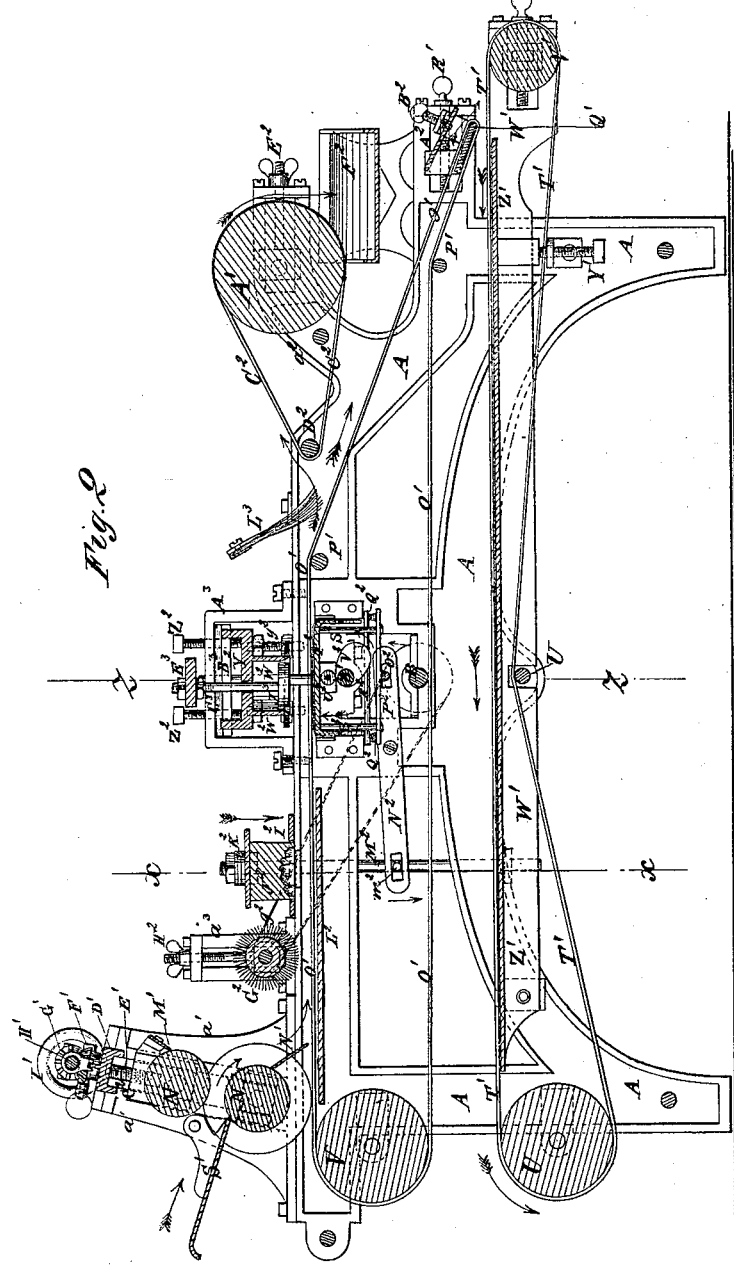

Be it known that we, JOHN RANNIE and ALEXANDER RANNIE, of Palmyra, county of Wayne, and State of New York, have invented a new and Improved Biscuit and Cracker Machine, of which the following is a specification:

Figure 1, Sheet 1, is a side view of our improved machine. Fig. 2, Sheet 2, is a vertical longitudinal section of the same. Fig. 3, Sheet 3, is an end view of the same. Fig. 4, Sheet 3, is a vertical cross-section of the same taken through the line $x\ x$, Figs. 1 and 2. Fig. 5, Sheet 3, is a detail horizontal section of the stamps taken through the line $y\ y$, Fig. 4. Fig. 6, Sheet 3, is a detail view of the inclined guide-plate. Fig. 7, Sheet 3, is a vertical cross-section of the machine taken through the line $z\ z$, Figs. 1 and 2. Fig. 8, Sheet 3, is a detail view of the scrap-separating brush. Fig. 9, Sheet 3, is a detail section taken through the line $v\ v$, Fig. 3.

The object of this invention is to furnish an improved machine, designed especially for use in the manufacture of what are known in the trade as "soft" goods, such as ginger snaps, lemon snaps, bon-bons, fancy desert-biscuits, &c., but which may be used with advantage for the manufacture of any kind of crackers, which shall be so constructed as to prevent the dough from adhering to and clogging the cutters, will indicate the exact thickness of dough that is passing from the feed-rollers to the cutters, will stamp the dough with various devices before it passes to the cutters, will enable the scraps to be readily separated, and will prevent the cakes of dough from turning over as they pass from the feed-apron to the pans upon the delivery-apron.

The invention consists in the construction and arrangement of parts as hereinafter described and claimed.

Similar letters of reference indicate corresponding parts.

A is the frame of the machine, in the middle part of the sides of which revolves the driving-shaft B. To the shaft B is attached a gear-wheel, C, into the teeth of which mesh the teeth of a gear-wheel, D, attached to the shaft $B^1$. The shaft $B^1$ revolves in bearings in the frame A, above the shaft B, and to its end is attached an eccentric, E, with which is connected, by an ordinary eccentric-strap, the end of a connecting rod, F. The other end of the connecting-rod F is pivoted to the lower end of the lever or double crank G, which is pivoted to the frame A, and the upper arm of which is slotted longitudinally. In the slot of the crank G is placed a pin, H, or a block, to which said pin is attached, and through said pin or block is formed a screw-hole, to receive a screw, $g^1$, which is swiveled to the end of the crank G, or to a cap attached to said end, so that the said pin H may be conveniently adjusted at any desired distance from the axis of said crank. To the inner end of the pin H is pivoted the end of a connecting-rod, I, to which, at a little distance from the crank G, is pivoted a branch connecting-rod, J. The forward ends of the rods I J are pivoted to arms $k'$, hung upon the journal of the lower feed-roller N. To the outer ends of the arms $k'$ are pivoted two pawls, K, which are placed the one above and the other below the ratchet-wheel L, and which are so formed that the engaging ends of said pawls may be held against the teeth of said ratchet-wheel by their own weight. The ratchet-wheel L is attached to the journal of the lower feed-roller N, which revolves in brackets $a^1$, attached to the forward end of the frame A, and the upper part of which is slotted to receive the bearing $C^1$ for the journal of the upper feed-roller N. To the journal of each of the feed-rollers N is attached a gear-wheel, M, which are connected by two intermediate gear-wheels, $m$, pivoted to the bracket $a^1$, so that the upper feed-roller N may be driven from the lower one, whatever be the distance apart at which said feed-rollers are adjusted. The upper ends of the brackets $a^1$ are connected by a cross-bar, $D^1$, to the ends of which are swiveled the screws $E^1$, which pass down into the screw-holes in the bearing-blocks $C^1$ of the upper feed-roller N, and to their upper ends are attached small bevel-gear wheels $F^1$, into the teeth of which mesh the teeth of small bevel-gear wheels $G^1$, attached to the cross-shaft $H^1$, so that by turning the said shaft the feed-rollers N may be adjusted at any desired distance apart. To one end of the shaft $H^1$ is attached a hand-wheel, $I^1$, for convenience in turning it. The shaft $H^1$ is secured in position, when adjusted, by a set-screw, $J^1$, which passes in through one of its bearings. Upon the middle part of the shaft $H^1$ is cut a screw-thread, $h'$, corresponding with the screw-thread of the swiveled screws $E^1$, and upon which is placed a nut, $K^1$, provided with a pointer pointing to a scale of division-marks upon a plate, $L^1$, attached to the cross-bar $D^1$, and the edge of which enters a notch in the pointer $K^1$, to prevent said pointer from being carried around by and with the said shaft $H^1$. This arrangement enables the feed-rollers to be conveniently adjusted to deliver a sheet of dough of any desired thickness.

To the brackets $a^1$ is attached a knife or plate, $M^1$, to bear against the forward side of the upper feed-roller N, and to scrape off any dough that may adhere to the said feed-roller. To the brackets $a^1$ is attached a plate or knife, $N^1$, to scrape off any dough that may adhere to the lower feed-roller N. The knife $N^1$ also serves as an apron to guide the sheet of dough to the feed-belt or apron $O^1$, which passes around the roller V, over guide-rollers $P^1$, attached to the frame A, and around the edge of the plate $Q^1$, attached to the rear end of the frame A in such a position that the rear part of said belt may have a downward inclination. To the ends of the plate $Q^1$ are attached, or upon them are formed, blocks, which pass through slots in the frame A, and have screw-holes formed through them to receive the screws $R^1$, which are swiveled to the frame A, so that by turning the said screws the plate $Q^1$ may be adjusted to tighten or slacken the belt $O^1$. To the brackets $a^1$ is attached an apron, $S^1$, from which the dough passes to the feed-rollers N. To the journal of the roller V is attached a gear-wheel, T, the teeth of which mesh into the teeth of an intermediate gear-wheel, S. The teeth of the intermediate gear-wheel S mesh into the teeth of the gear-wheel R, attached to the journal of the roller U, around which passes the delivery-belt $T^1$. The belt $T^1$ passes over a guide-roller, $U^1$, attached to the frame A, and around a roller, $V^1$, pivoted to blocks that work in slots in the ends of the bars $W^1$, and are provided with screws $X^1$, swiveled to the ends of said bars for convenience in adjusting the tension of the delivery-belt $T^1$. The forward ends of the bars $W^1$ are pivoted to the frame A, and their slotted ends are supported adjustably by screws $Y^1$ that pass up through stationary nuts attached to the frame A, so that the belt $T^1$ may be adjusted closer to or farther from the end of the feed-bolt $O^1$, as may be required. To the bars $W^1$ is attached a plate, $Z^1$, for the upper part of the belt $T^1$ to rest upon, to prevent it from being pressed down by the weight of the pans placed upon it to receive the cakes as they pass from the feed-belt $O^1$. $A^2$ is an inclined plate, the ends of which are secured to arms attached to the ends of the plate $Q^1$ by set-screws $B^2$, so that the said plate $A^2$ may be adjustable closer to or farther from the end of the feed-belt $O^1$, as the thickness of the cakes may require. The plate $A^2$ serves as a stop and guide to the cakes and prevents them from turning over as their forward edges drop from the belt $O^1$ into a pan placed upon the belt $T^1$. To the journal of the roller U, or to the gear-wheel R, is attached a ratchet-wheel, Q, with the teeth of which engages a pawl, P. The pawl P is pivoted to an arm, $p'$, that rides upon the journal of the roller U, and to which is pivoted the end of a connecting-rod, O, the other end of which is pivoted to the pin H of the crank-arm G. To the pin H is also pivoted the end of a connecting-rod, X, the other end of which is pivoted to an arm, $y^1$, which rides upon the journal of the roller $A^1$, and has a pawl, Y, pivoted to it. The pawl Y engages with the teeth of the ratchet-wheel Z attached to the journal of the roller $A^1$. The journals of the roller $A^1$ revolve in brackets $a^2$, formed upon or attached to the frame A. Around the roller $A^1$ passes an endless belt, $C^2$, which also passes around a small roller, $D^2$, attached to the frame A at a little distance from and about upon a level with the upper guide-roller $P^1$ of the feed-belt $O^1$. The bearings of the roller $A^1$ slide in slots in the brackets $a^2$, so that they may be adjusted by the screws $E^2$ to regulate the tension of the belt $C^2$. To the frame A, or to brackets attached to said frame, is secured a table, trough, or spout, $F^2$, to receive the scraps from the scrap-belt $C^2$, and which may be level or inclined, as may be convenient. $G^2$ is a cylindrical brush, the journals of which revolve in bearings in slotted brackets $a^3$ attached to the frame A, and are adjusted to raise and lower said brush by screws $H^2$. The brush $G^2$ is designed to brush off the flour from the sheet of dough as it comes from the feed-rollers N. The brush $G^2$ is driven by a band, $g^2$, that passes around a pulley attached to one of the journals of said brush and around a pulley attached to the end of the shaft B. To the top of the frame A is attached a plate, $I^2$, through which are formed a number of holes to receive and serve as guides for the dies $J^2$, which are attached to a plate, $K^2$, and which are designed to imprint or stamp an ornamental device upon the parts of the sheet of dough that will form the cakes. The sheet of dough will be supported while being operated upon by the dies or stamps $J^2$ by a plate, $L^2$, attached to the frame A, just below the upper part of the feed-belt $O^1$. The ends of the plate $K^2$ that carries the dies or stamps $J^2$ are attached adjustably to the upper ends of the two rods, $M^2$, that pass down through guides or keepers $m^1$, attached to the frame A. To the inner sides of the rods $M^2$ are rigidly attached arms $m^2$, which pass through holes in the ends of $C^2$, substantially as herein shown and described.

7. The combination of the adjustable inclined plate $A^2$, with the adjustable plate $Q^1$, around which the feed-belt $O^1$ passes, and with the said feed-belt $O^1$ and the delivery-belt $T^1$, substantially as herein shown and described.

8. The combination of the rods $M^2$, provided with the arms $m^2$, the pivoted bars $N^2$, and the rod $O^2$, with the stamping device $I^2 J^2 K^2$, and with the bar $P^2$, the springs $Q^2$, the rods $S^2$, plate $T^2$, and the cams $V^2$, substantially as herein shown and described, for operating the said stamping device at the same time with the cutting device, as set forth.

JOHN RANNIE.
ALEXANDER RANNIE.

Witnesses:
I. S. WILLIAMSON,
WILLIAM H. DENNIS.

the bars $N^2$. The bars $N^2$ are pivoted to the sides of the frame A, and through holes in their inner ends pass the ends of a rod, $O^2$, to the center of which is rigidly attached a cross-bar, $P^2$.

To the ends of the cross-bar $P^2$ are attached the middle parts of two springs, $Q^2$, the ends of which rest against two rods or bars, $R^2$, attached to the frame A. To the end parts of the cross-bar $P^2$ are attached the ends of two short rods, $S^2$, the upper ends of which are attached to a plate, $T^2$, which crosses the frame A, beneath the upper part of the feed-belt $O^1$, and its ends move up and down between guides attached to the frame A. To lugs attached to the under side of the plate $T^2$ are pivoted small rollers $U^2$ for the cams $V^2$, attached to the shaft $B^1$, to bear against, to raise the plate $F^2$, and press the sheet of dough up against the cutters $W^2$ to cut out the cakes.

The plate $T^2$ should have a sheet or plate, $X^2$, of rubber placed upon it to form a yielding bed, to be pressed against the cutters $W^2$.

The cutters $W^2$, which may be of any desired shape, are attached to a plate, $Y^2$, the ends of which rest upon bolts or screw-pins $y^2$, adjustably attached to the frames A, and have holes formed through them to receive the guide-pins $y^3$ attached to the plate $T^2$.

The ends of the plate $Y^2$ are held down upon the pins or bolts $y^2$ by set-screws $Z^2$, which pass through holes in the bows $A^3$, and through screw-holes in the bars $B^3$, placed within said bows $A^3$, and through holes in the rubber plates or blocks $C^3$ interposed between the bars $B^3$ and the bows $A^3$, so that the set-screws $Z^2$ can be adjusted without affecting the elasticity of the rubber $C^3$.

The ends of the bows $A^3$ are bent outward, and in one of said ends is formed a hole, and in the other a slot, to receive the screws or bolts by which the said bows $A^3$ are secured to the frame A, so that the said bows and their attachments may be swung out to release the plate $Y^2$, and allow it and its attachments to be readily detached.

The cutters $W^2$ pass through holes in the plate $D^3$ placed beneath the plate $Y^2$, and attached to the lower ends of the bolts or rods $E^3$, which pass up through holes in the plate $Y^2$, and their upper ends are adjustably attached to the plate $F^3$. The plate $F^3$ rests upon stop-pins $G^3$ attached to the plate $Y^2$, and in its ends are inserted set-screws $H^3$ in such positions that their lower ends may rest upon the upper ends of the guide-pins $y^3$ attached to the plate $T^2$. The plate $F^3$ is held down upon the pins $G^3$, and the plate $D^3$ is held at the lower ends of the cutters $W^2$ by the spiral springs $I^3$ placed upon the rods $E^3$, and interposed between the plates $Y^2$ and $D^3$.

Into the cutters $W^2$ are fitted follow-plates or blocks $J^3$, which are attached to the lower ends of the rods $K^3$. The rods $K^3$ pass up through holes in the plate $Y^2$, and their upper ends are adjustably attached to the plate $F^3$.

With this construction, as the plate $T^2$ rises it presses the sheet of dough up against the cutters $W^2$, the pins $y^3$ at the same time raising the plates $F^3 D^3$, and drawing the followers $J^3$ into the said cutters $W^2$, leaving them free to cut the cakes. As the plate $T^2$ retires the plate $D^3$ and followers $J^3$ are pressed down by the springs $I^3$ forcing the cut dough off the cutters $W^2$, if it should not fall back by its own weight.

The stamps $J^2$ and cutters $W^2$ are placed at such a distance apart that the cutters $W^2$ may cut out the parts of the dough imprinted by the said stamps $J^2$.

As the cakes and scraps begin to pass down the inclined part of the feed-belt $O^1$ the end of the scrap is raised and placed upon the scrap-belt $C^2$, up which the scrap is carried, and from which it falls into the trough $F^2$, while the cakes are carried down the inclined part of the feed-belt $O^1$, and are deposited in the pans upon the delivery-belt $T^1$.

The separation of the scrap from the cakes is facilitated by the brush $L^3$, the ends of the head of which are bolted to the slotted upper ends of arms $M^3$, attached to the frame A, in such positions that the bristles of the said brush may rest upon the dough at the point where the scrap begins to rise to pass up the scrap-belt $C^2$, so as to push the cakes out of the said scrap by the elasticity of the said bristles.

Having thus described our invention, we claim as new and desire to secure by Letters Patent—

1. The combination of the rising and falling bed-plate $T^2$, the stationary cutters W, yielding plate D, and plungers $J^3$, and springs $I^3$, all arranged to operate substantially as shown and described.

2. The combination of the cams $V^2$, the springs $Q^2$, the cross-bar $P^2$, and the rods $S^2$, with the shaft $B^1$, the frame A, and the bed-plate $T^2$, to raise and lower said bed-plate $T^2$, at regular intervals, substantially as herein shown and described.

3. The combination of the two plates $D^3 F^3$, the connecting-rods $E^3$, the springs $I^3$, the followers $J^3$, the pins $K^3$, the stop-pins $y^3$, the set-screws $H^3$, and the pins $G^3$, with the plate $Y^2$ that carries the cutters $W^2$, and with the movable bed-plate $T^2$, substantially as herein shown and described.

4. The combination of the bows $A^3$, the bars $B^3$, the rubber blocks $C^3$, and the set-screws $Z^2$, with the ends of the plate $Y^2$ that carries the cutters $W^2$, and with the screw-pins $y^2$, and the frame A, substantially as herein shown and described.

5. The combination of the screw-thread $h'$, the index $K^1$, and the scale-plate $L^1$, with the shaft $H^1$, the gear-wheels $G^1 F^1$, and the screws $E^1$ that adjust the feed-rollers N, substantially as herein shown and described.

6. The combination of the brush $L^3$, made vertically adjustable, as specified, with the frame A, the feed-belt $O^1$, and the scrap-belt